United States Patent
Nordmark et al.

(10) Patent No.: US 7,944,899 B2
(45) Date of Patent: May 17, 2011

(54) PREDICTIVE ROUTING TECHNIQUE IN THE AD HOC WIRELESS NETWORK

(75) Inventors: Erik Nordmark, Mountain View, CA (US); Samita Chakrabarti, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 140 days.

(21) Appl. No.: 12/058,509

(22) Filed: Mar. 28, 2008

(65) Prior Publication Data

US 2009/0046712 A1  Feb. 19, 2009

Related U.S. Application Data

(60) Provisional application No. 60/956,075, filed on Aug. 15, 2007.

(51) Int. Cl.
*H04W 4/00* (2009.01)
(52) U.S. Cl. ........................................................ 370/338
(58) Field of Classification Search .................. 370/389, 370/338, 254, 351, 310, 392, 238
See application file for complete search history.

(56) References Cited

U.S. PATENT DOCUMENTS

| | | | |
|---|---|---|---|
| 7,342,900 B2 * | 3/2008 | Xiong et al. | 370/328 |
| 7,349,360 B2 * | 3/2008 | Gutierrez et al. | 370/315 |
| 2002/0191573 A1 * | 12/2002 | Whitehill et al. | 370/338 |
| 2005/0080924 A1 * | 4/2005 | Shang et al. | 709/239 |
| 2006/0129367 A1 * | 6/2006 | Mishra et al. | 703/13 |
| 2006/0161635 A1 * | 7/2006 | Lamkin et al. | 709/217 |
| 2008/0072034 A1 * | 3/2008 | Lescuyer et al. | 713/153 |

* cited by examiner

*Primary Examiner* — Man Phan
*Assistant Examiner* — Nourali Mansoury
(74) *Attorney, Agent, or Firm* — Osha • Liang LLP

(57) ABSTRACT

In a particular embodiment of the present invention, a forwarding node in an ad hoc network collects sets of node information pertaining to its neighbor nodes. An example of a type of node information is history information that indicates previous time periods during which a neighbor node has been available for communication. Other types of node information may include proximity information that indicates how far a neighbor node is from the forwarding node. In selecting a routing path, the forwarding node takes into account information collected in the sets of node information. A routing path can be selected to include a neighbor node having the highest probability to be available for communication. Additionally or alternatively, a routing path may be selected to minimize the power transmission level required for the forwarding node to forward data packets.

14 Claims, 4 Drawing Sheets

PREDICTIVE ROUTING TECHNIQUE IN THE AD HOC WIRELESS NETWORK

This application claims the benefit of U.S. Provisional Application entitled "PREDICTIVE ROUTING TECHNIQUE IN THE AD HOC WIRELESS NETWORK", No. 60/956,075, filed Aug. 15, 2007. The entire contents of this provisional application are hereby incorporated by reference.

BACKGROUND

An ad hoc computing network comprises computing nodes that form a network topology amongst themselves on an ad hoc basis. Unlike traditional networks whose network topologies are planned, provisioned, or configured, ad hoc networks typically must rely on self-configuring abilities of their respective nodes to discover neighbors and form network topologies. Furthermore, because a node in an ad hoc network is allowed to autonomously alter its link relationships with other nodes, a network topology previously formed can undergo changes from time to time in a seemingly random manner.

For example, a node in an ad hoc computing network may decide to withdraw from the network. The withdrawal would cause all the link relationships (to, from or through the node) to be rendered invalid. Therefore, the remaining nodes in the ad hoc computing network need to reconfigure themselves drawing on their self-configuring capabilities. Specifically, this reconfiguration can take the form of discovering one or more new routes without the withdrawn node playing any role therein.

In an ad hoc network such as a wireless mobile network that implements AODV, to forward a data packet to a destination node, a forwarding node (a special example of which is an originating node of a data packet) can initiate a route discovery if a path to the destination node does not exist or is no longer valid. A route may be considered as invalid if it has been idle for a considerable amount of time, for example. To discover a (new) valid path and/or a next hop node, the forwarding node can broadcast a route request message. This broadcast can be made by flooding the route request message in an immediate area of the forwarding node. The scope or size of the immediate area of the forwarding node flooded depends on a transmission power level accompanying the forwarding node's radio signal(s) which encodes the route request message.

If a receiving node of the route request message has a valid path to the destination node, the receiving node can reply to the forwarding node in a route reply message. In response to receiving the reply, the forwarding node may create or update a route to the destination node in its routing table using the receiving node as a next hop, or may add a proposed routing path described in the receiving node's reply to a set of candidate routing paths from which an optimal routing path may be chosen.

If the receiving node of the route request message has no valid path to the destination node, the receiving node can further broadcast a request for a route to the destination by flooding a new route request message in its own immediate area. The scope or size of the receiving node's immediate area flooded depends on a transmission power level accompanying the receiving node's radio signal which encodes the new route request message. This process continues until a valid routing path has been established between the originating node and the destination node.

Thus, ripple-like effects are typically caused each time when a route discovery must be made; many nodes in the ad hoc network may be involved in successive flooding of request messages and generating of response messages.

Since nodes in an ad hoc network typically are mobile devices that carry batteries as their energy sources, these existing techniques have a serious disadvantage of draining precious battery powers of nodes, if the nodes are involved in frequent route discoveries, as would be expected in a relatively mobile ad hoc network.

Under the existing techniques, if there is more than one path to a destination node, a route that contains the fewest hops is selected as a best path to the destination. This best path would be used to route any unicast messages to the destination node. However, if a best path with the fewest hops has longer hop-to-hop distances than another path with more hops but shorter hops, the power required to transmit a signal through the best path might be much higher than the power required to do the same on the other route, as it is well known that the power required is inversely proportional to the distance squared between a transmitting node and a receiving node (e.g., a 2× increase of distance causes 4× increase of power consumption). Thus the best path may consume much more power. If the given forwarding node had only a limited battery capacity or otherwise were sensitive to power consumption, then the best path with the fewest hops would not be optimal.

Thus, an improved way of selecting a route in an ad hoc network is needed.

SUMMARY

In accordance with an embodiment of the present invention, a forwarding node in an ad hoc network collects a set of node information pertaining to each neighbor node. In some embodiments, the forwarding node also collects hop information relating to routing paths to various destination nodes. Furthermore, a set of node information pertaining to a neighbor node may comprise history information indicating previous time periods during which the neighbor node has been available for communication. In one embodiment, this set of node information is created when the forwarding node discovers the presence of the neighbor node. In one embodiment, this set of node information is updated by the forwarding node when it receives updates from the neighbor node or notifications from other nodes which contain information about the neighbor node. Additionally or alternatively, the forwarding node automatically detects changes relating to the neighbor node, for example, by failing to receive any acknowledgment from the neighbor node in data communication or low level protocol operations (including those relating to a radio link layer).

If there were only one routing path available to a destination node, the forwarding node would have no choice but use the available routing path and forward any data packet addressed to the destination node to a neighbor node that is specified by the available routing path.

However, where there are multiple routing paths over multiple neighbor nodes to a destination node from the forwarding node, the forwarding node may select a best path based on multiple sets of node information collected. In one embodiment, the forwarding node selects each routing path (of the multiple routing paths to the destination node) that includes a neighbor node as a (next) hop and determines, based at least partially upon history information in a set of node information associated with the neighbor node, whether the neighbor node is likely to be currently available for communication. In response to a determination that a neighbor node is not likely to be currently available for communication, the forwarding node turns to select another routing path to the destination node that does not include the neighbor node as a hop.

In one embodiment, if there are two or more neighbor nodes currently available for communication as determined by the previous step, the forwarding node calculates, based at least partially upon the history information, an availability probability for each of the two or more neighbor node that indicates a likelihood that the each of the two or more neighbor node is currently available for communication.

In one embodiment, the history information in each set of node information also comprises longevity information indicating how long a neighbor node remains available for communication when it is available for communication. In one embodiment, the longevity information is taken into account in calculating availability probability for the associated node. Once availability probabilities for all of the two or more neighbor nodes are determined, the forwarding node selects one neighbor node that is associated with a routing path from the forwarding node to the destination that has the highest availability probability.

In any event, a neighbor node may be determined to be (most) likely to be currently available for communication. In response to this determination, the forwarding node forwards any data packet addressed to the destination node via the routing path that specifies the neighbor node as the next hop.

In one embodiment, in addition to the history information that indicates previous time periods during which the neighbor node has been available for communication, the forwarding node also collects proximity information indicating how far the neighbor node is relative to the forwarding node. This information is needed by the forwarding node to determine not just a logical hop count, but also a physical distance of a path that goes through the neighbor node. Furthermore, a transmission power level that enables a signal to carry data packets to the neighbor node can also be estimated based on this proximity information. In one embodiment, the proximity information and its derivative information (such as transmission power level required based on the proximity information) are included in the set of node information and taken into account in selecting the routing path to the destination node.

In one embodiment, the forwarding node additionally collects energy source information indicating a type of energy source used to power a neighbor node, and stores the information in the set of node information. For example, a neighbor node may be plugged into a power socket on the wall. Given that information, transmission power level for the neighbor node would not be of a concern. In fact, everything else being equal, a route that utilizes the neighbor node with a plug-in energy source is favored. In a different scenario where the neighbor node is instead powered by a (tiny) limited capacity battery (due to a footprint limitation, for example), everything else being equal, a route that utilizes the neighbor node should be avoided, even though the power transmission level required might be the same. In this manner, the energy source information can be taken into account in selecting the routing path to the destination node, in accordance with an embodiment of the present invention.

Adding to the information as described thus far, in one embodiment, the forwarding node also collects mobility information indicating whether the neighbor node is mobile or stationary relative to the forwarding node and stores the information collected in the set of node information. In a similar manner as described above with respect to other types of information, the mobility information can be taken into account in determining whether the neighbor node is likely to be currently available for communication, in accordance with an embodiment of the present invention.

By carrying out the above methodology, the forwarding node selects an optimal routing path that goes through a neighbor node that is most probable to be available for communication. As a result, the number of route (re-)discoveries caused by node unavailability is reduced, which leads to fewer incidents of flooding messages in the ad hoc network. Accordingly, power consumption by the nodes is also reduced.

Furthermore, since this routing path selection takes into account other information including proximity information of neighbor nodes, the forwarding node, in accordance with one embodiment of the present information, can choose a routing path that allows the forwarding node to use the lowest power transmission level required for data packet forwarding. As a result, where the forwarding node has a limited battery capacity, this methodology is also capable of extending the life span of the forwarding node.

DETAILED DESCRIPTION OF EMBODIMENT(S)

System Overview

In accordance with one embodiment of the present invention, the methodology disclosed herein is implemented by a forwarding node in an ad hoc network. For purposes of the present invention, the forwarding node may be any type of node in the ad hoc network. Examples of forwarding nodes may include, but are not limited to, a mobile computing device that uses wireless (radio) signal in communication, or a stationary computing device in an ad hoc network that comprises nodes that may or my not be mobile. Other examples of forwarding nodes may be a computing device that is stationary (e.g., a device installed on a train platform) with respect to one reference frame (e.g., the train platform) but mobile with respect to another reference frame (e.g., a passing-by train). To illustrate how such a forwarding node may operate in accordance with one embodiment of the present invention, reference will be made to the sample ad hoc network shown in FIG. 1, which may comprise the forwarding node.

Figure 1:
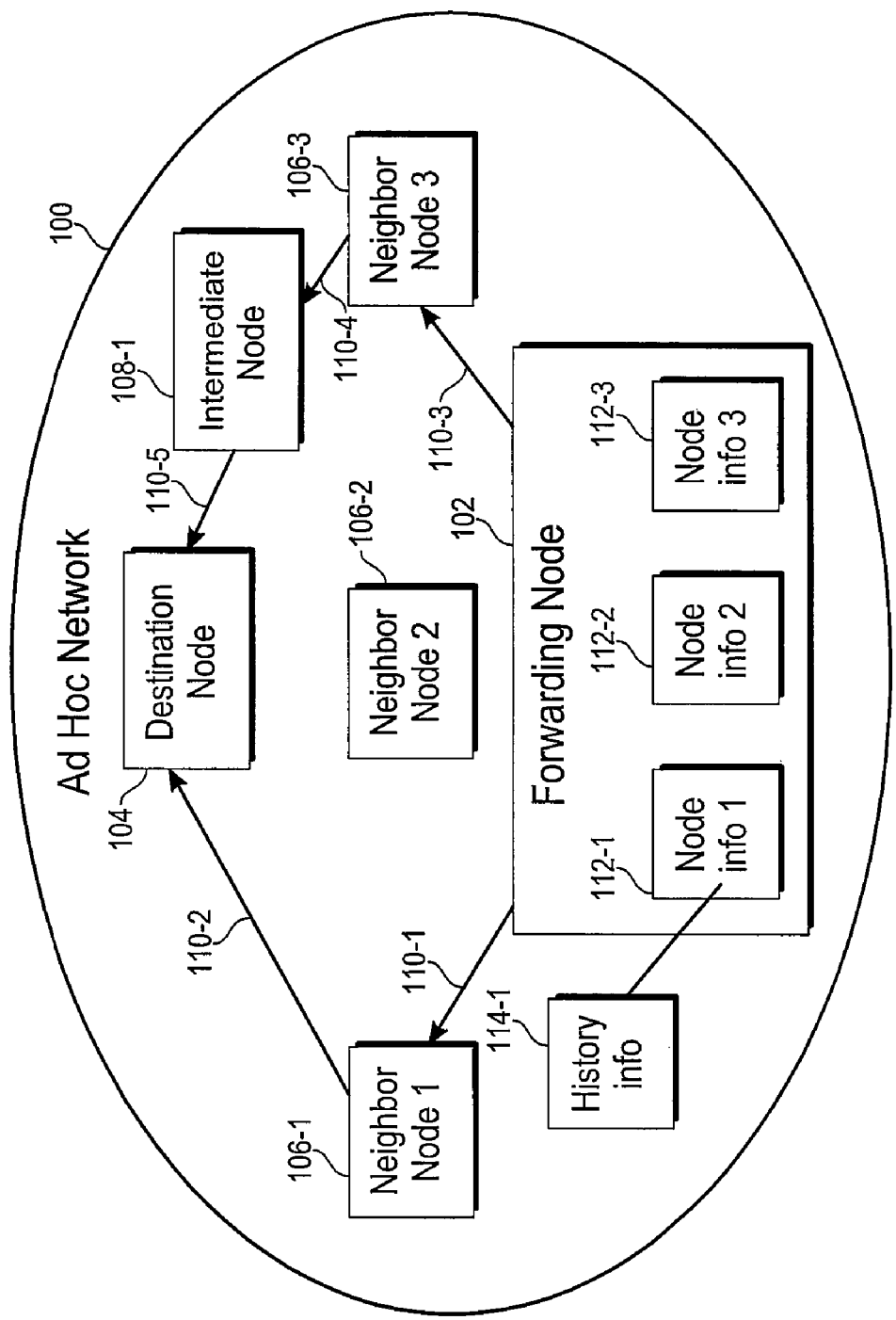
FIG. 1 shows a sample ad hoc network, in accordance with one embodiment of the present invention.

As shown in FIG. 1, the ad hoc network 100 comprises a forwarding node 102, a destination node 104, three neighbor nodes 1, 2 and 3 (106-1, 106-2 and 106-3 respectively), and an intermediate node 108. The three neighbor nodes 1-3 are neighbor nodes of the forwarding node 102 and may or may not be neighbor nodes to any other nodes in the ad hoc network 100.

As illustrated, the forwarding node 102 has two paths to the destination node 104. The first path is through the neighbor node 1 and made up of two (inter-nodal) links, i.e., 110-1 and 110-2. The second path is through the neighbor node 3 and made up of three (inter-nodal) links, 110-3, 110-4 and 110-5.

In one embodiment, the forwarding node 102 can access data storage such as a database. Using this data storage, the forwarding node 102 can store one or more sets of node information 112. In one embodiment, each of the one or more sets of node information stores history information (shown as 114-1 in FIG. 1), proximity information, longevity information, energy source information, mobility characteristic, etc., relating to a neighbor node.

History information indicates time periods during which a neighbor has been available for communication. For example, history information 114-1 stored in a set of node information 112-1 indicates time periods during which the neighbor node 1 has been available for communication.

History information relating to a neighbor node 106 is gathered by the forwarding node through its monitoring of messages relating to the neighbor node 106. For illustration purposes, suppose that the ad hoc network uses Ad-hoc On-demand Distance Vector (AODV) routing protocol. In such a network, the forwarding node 102 may, for example, monitor Route Request (RREQ) messages originated from its neighbor nodes in the network. Once such a message is received from a node never heard from before, the forwarding node 102 creates a set of node information and a data structure (in the set of node information) to store history information (e.g., one or more time intervals, one of which is the current time interval). In addition, the forwarding node 102 notes the time of the RREQ message, and updates the current time interval with a start time as the time of the RREQ message. Similarly, if the forwarding node 102 sends a data packet to the neighbor node but fails to receive any reply or acknowledgement from the neighbor node, then the forwarding node 102 notes the present time and locates the current time interval stored in the history information 114 in the set of node information 106 relating to the neighbor node 106 and updates the current time interval with an end time as the present time noted. When this neighbor node is heard again, a new current time interval that is separate from the previous current time interval is created or located. This new current time interval is maintained and updated in the same manner as described with respect to the previous current time interval. In addition to monitoring its data communication with all the neighbor nodes 106 for the purpose of maintaining and updating history information 114 relating to the neighbor nodes 106, the forwarding node 102 can also monitor Route Error (RERR) messages. In one embodiment, when receiving a RERR relating to a neighbor node 106, the forwarding node 102 may send a protocol message to determine whether the neighbor node 106 is still around. In this embodiment, time periods indicating availability of the neighbor node 106 for communication may be promptly determined. As used herein, the term "protocol message" refers to a handshaking message that is exchanged regularly (e.g., like a hello message in the Open Shortest Path First protocol) or irregularly (e.g., whenever a node in an ad hoc network wishes to check existence of its neighbors).

In some embodiments, to calculate availability of a neighbor node at any given time, say a time of a day, the forwarding node is configured to look at whether a neighbor node is available at the time of a day in comparable days in the past. For example, the forwarding node may be configured to look at whether a neighbor node is available at a particular time on previous weekdays if the current day is any weekday. Thus, if the neighbor node has been available for 4 weekdays out of every five weekdays in the past four weeks, then the availability probability for the neighbor node may be determined as ⅘.

Alternatively, for an ad hoc network that exhibits a predictive pattern on a weekly basis, the forwarding node may be configured to look at a node's availability at the time of a day and on a particular day of week, say Monday, for N number of weeks in the past. Thus, if the neighbor node has been available for the past 3 Mondays out of 5 weeks in the past, then the availability probability for the neighbor node may be determined as ⅗.

In one embodiment, once availability probabilities with respect to all neighbor nodes are calculated based on a predictive pattern with which the forwarding node has been configured, a routing path is selected for forwarding data packets to the destination node if the selected routing path corresponds to a neighbor node of the highest availability probability among all neighbor nodes associated with all candidate routing paths.

As noted before, longevity information indicates how long a neighbor node 106 remains available for communication when it is available for communication. In one embodiment, longevity information about a neighbor node 106 can be deduced simply by taking the difference between an end time and a start time of a comparable time interval. A comparable time interval might be a time interval on a previous day (say a same day of week last week) at same time of a day. For example, the forwarding node 102 can surmise how long a neighbor node 106 is available for communication at a certain time of a day by looking at a time interval on a previous day at that certain time. If no time interval overlaps that certain time on the previous day, then the longevity information indicates that the neighbor node 106 has a zero lifespan. If, however, there is a time interval on the previous day that covers the time of the day interested, the longevity information can be obtained simply by taking differences between an end time and a start time of the time interval. Referring to FIG. 1, if the first path (102→the neighbor node 1→destination node) is determined to have an availability probability of 0.5, and if longevity information relating to the neighbor node 1 indicates that the neighbor node 1 will be available for another five hours, then the forwarding node assigns a weight factor (corresponding to five remaining hours) to the first (routing) path. In one embodiment, each additional hour of availability is given a weight factor of 0.2. Thus, an overall (unscaled) availability probability for the first path would be 0.5. In the end, the availability probability of both (routing) paths are compared and the one with the highest availability probability is selected for actual routing of data packets between the forwarding node 102 and the destination node 104, according to an embodiment of the present invention.

In one embodiment, energy source information about a neighbor node 106 is also collected by the forwarding node 102 and taken into account when routing paths are evaluated. In one embodiment, this information is embedded in protocol messages exchanged between neighbors. In one embodiment, energy source information includes information relating to a type of energy source the neighbor node 106 uses. Among possible types of energy sources are socket plug-in, battery powered, solar powered, unknown, etc. In one embodiment, to determine a suitable routing path, the forwarding node 102 assigns a weight factor to a candidate routing path based on what type of energy source an associated next hop neighbor node 106 uses. In one embodiment, socket plug-in is assigned a weight factor of 3, batter powered 1, solar powered 0 to 3 depending on the time of day, unknown default to 2, etc. These and other variations of assigning weight factors based on types of energy sources used by neighbor nodes are within the scope of the present invention. For example, referring to FIG. 1, if the first path (102→the neighbor node 1→destination node) is determined to have an availability probability of 0.5, and if the neighbor node 1 uses solar power, then the forwarding node assigns a weight factor 1 to 3 depending on the time of day at the present time. If the present time is around noon hours, then the weight factor can be assigned as 3. Thus, an overall (unscaled) availability probability for the first path would be 1.5. However, if the present time is around midnight hours, then the weight factor can be assigned 0. Thus, an overall (unscaled) availability probability for the first path would be 0. Similar calculation can be made for the second path. In the end, the availability probability of both (routing) paths are compared and the one with the highest availability probability is selected for actual routing of data packets between the forwarding node 102 and the destination node 104, according to an embodiment of the present invention.

In one embodiment, mobility characteristic about a neighbor node 106 is also collected by the forwarding node 102 and taken into account when routing paths are evaluated. This mobility characteristic can be based on location information of the neighbor node 106 and the forwarding node 102. In one embodiment, the neighbor node 106 and the forwarding node 102 may determine their locations at a given time t1 through a Global Positioning System (GPS) and this information for t1 is exchanged between neighbors in protocol messages. At another time t2, the neighbor node 106 and the forwarding node 102 may determine their positions again through the GPS and this position information for t2 is also exchanged between neighbors in protocol messages. Through the position information at t1 and t2, the forwarding node 102 can determine whether the neighbor node 106 is mobile or stationary with respect to the forwarding node 102. In one embodiment, to determine a suitable routing path, the forwarding node 102 assigns a weight factor to a candidate routing path based on what type of mobile characteristic an associated next hop neighbor node 106 has. In one embodiment, if the neighbor node 106 is mobile to the forwarding node 102, a routing path associated with the neighbor node 106 is assigned a weight factor of 1. Likewise, if the neighbor node 106 is stationary to the forwarding node 102, a routing path associated with the neighbor node 106 is assigned a weight factor of 2. These and other variations of assigning weight factors based on types of mobile characters of neighbor nodes relative to a forwarding node are within the scope of the present invention. Referring to FIG. 1, if the first path (102→the neighbor node 1→destination node) is determined to have an availability probability of 0.5, and if the neighbor node 1 is mobile relative to the forwarding node 102, then the forwarding node assigns a weight factor 1 to the first (routing) path. Thus, an overall (unscaled) availability probability for the first path would be 0.5. However, if the neighbor node 106-1 is stationary relative to the forwarding node 102, then the weight factor can be assigned as 2. Thus, an overall (unscaled) availability probability for the first path would be 1.0. In the end, the availability probability of both (routing) paths are compared and the one with the highest availability probability is selected for actual routing of data packets between the forwarding node 102 and the destination node 104, according to an embodiment of the present invention.

The ad hoc network here has been described as comprising a forwarding node, three neighbor nodes, one intermediate node and a destination node. It should be noted that this is for illustrative purposes only. For purposes of the present invention, other nodes can also appear in the ad hoc network. Thus, all variations of numbers of nodes are within the scope of the present invention.

The number of neighbor nodes here has been described as three. It should be noted that this is for illustrative purposes only. For purposes of the present invention, other numbers of neighbor nodes can also appear in the ad hoc network. For example, a forwarding node may have more or few than three neighbors. Thus, all variations of numbers of neighbor nodes are within the scope of the present invention.

The forwarding node here has been described as one. It should be noted that this is for illustrative purposes only. For purposes of the present invention, any node in the ad hoc network may be a forwarding node. For example, a forwarding node may or may not an originating node for a particular path to a destination node. To preceding nodes on the particular path, the forwarding node may be a neighbor node and/or intermediate node, relative to the preceding nodes on the path. Thus, this and other variations of what constitutes a forwarding node are within the scope of the present invention.

The energy source, mobility, and proximity information here has been described as exchanged via protocol messages. It should be noted that this is for illustrative purposes only. For purposes of the present invention, other ways of exchanging information can be used. For example, proximity information may be shared between nodes via control fields in headers of data packets. Thus, this and other ways of sharing the described information are within the scope of the present invention.

The discussion here has been described with occasional references to AODV. It should be noted that this is for illustrative purposes only. For purposes of the present invention, other protocols of forming an ad hoc network can be used. For example, Dynamic Source Routing (DSR) may be used in forming the ad hoc network without loss of generality of the present invention. Thus, use of various ad hoc network protocols in conjunction with the present invention is within the scope of the present invention.

The discussion here has been described as calculating availability probability and using other information as weight factors that are used to compute an (unscaled) availability probability for comparison among all candidate (routing) paths. It should be noted that this is for illustrative purposes only. For purposes of the present invention, other ways of using the information contained in sets of node information can be used. For example, a forwarding node may use other types of information such as proximity as a main factor and the availability probabilities as adjusting factors (as will be further explained). Thus, all variations of using a type of information in node information as a main factor in evaluating candidate (routing) paths are within the scope of the present invention.

Sample Embodiments

Figure 2:
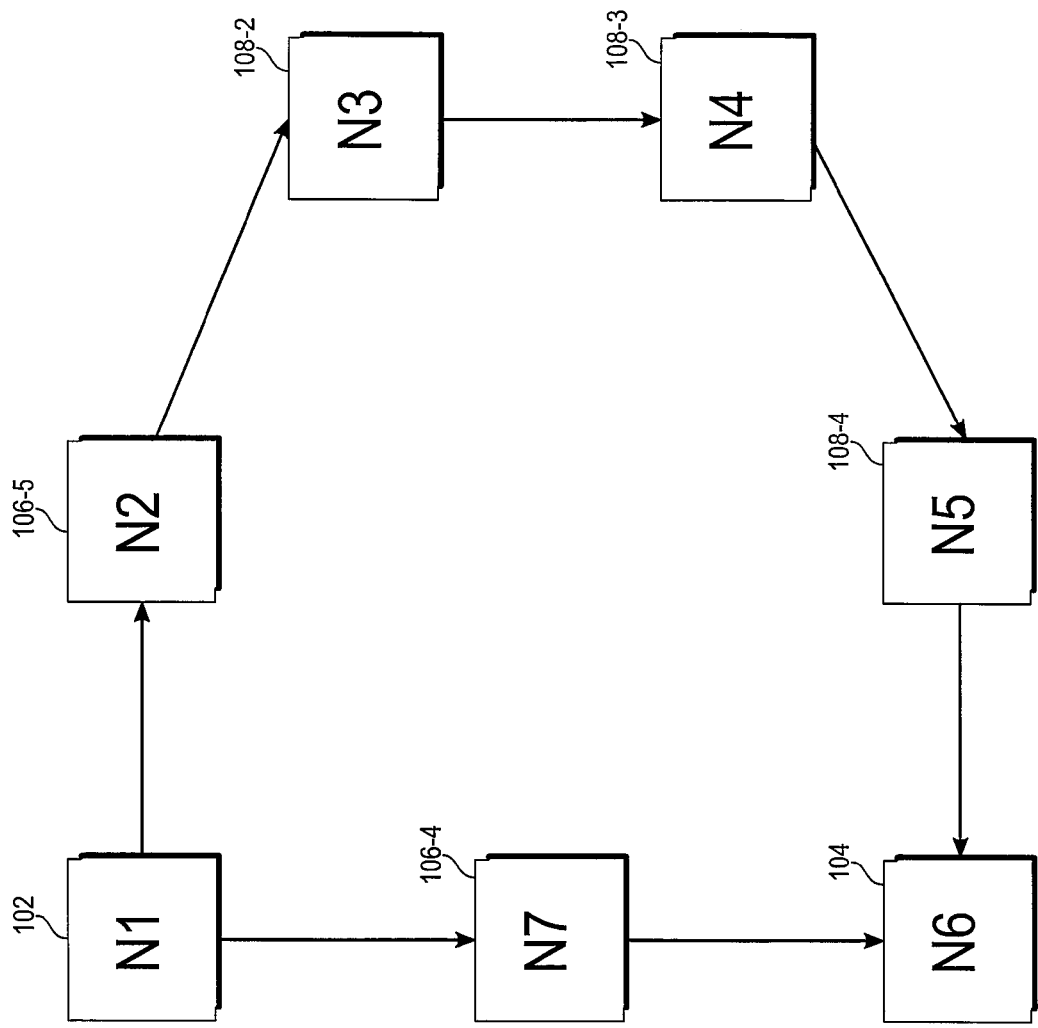
FIG. 2 shows a sample routing paths configuration between a forwarding node and a destination node, in accordance with one embodiment of the present invention.

FIG. 2 shows a sample routing paths configuration between a forwarding node N1 (say 102 of FIG. 1) and a destination node N6 (say 104 of FIG. 1) comprising two candidate routing paths that span across two neighbor nodes N2 and N7 (106-4 and 106-5, respectively) and three intermediate nodes N3, N4 and N5 (108-2, 108-3 and 108-4, respectively), in accordance with one embodiment of the present invention.

Suppose that the forwarding node N1 maintains sets of node information about its neighbors that include the neighbor nodes N2 and N7. Suppose, further, that the sets of node information maintained by the forwarding node N1 comprise proximity information that indicates how far the neighbor nodes N2 and N7 are relative to the forwarding node N1. For example, in FIG. 2, the node information relating to N2 might indicate a distance of 50 meters between the forwarding node 102 and the neighbor node N2. Similarly, the node information relating to N7 might indicate a distance of 100 meters between the forwarding node 102 and the neighbor node N7.

In one embodiment, the forwarding node estimates what respective transmission power levels it would need to communicate with the neighbor nodes N2 and N7 and selects a routing path with the lowest transmission power level among all candidate (routing) paths. In the present example, even though the second routing path (going through N2) takes more hops and has an overall longer spatial length (assuming that is the case) than the first routing path (going through N7), the second routing path is still selected for routing data packets between N1 and N6, everything else (including, for example, availability probability based on history information) being equal. This is so because a distance between N1 and N2 is shorter than a distance between N1 and N7. As the distance between N1 and N2 is shorter, lower power transmission level is required for N1 to forward data packets on the second routing path. This selection may use the same methodology as previously described with respect to calculating an overall weighted availability probability for each candidate (routing) path.

Alternatively, a forwarding node may select a routing path such that overall path level power consumption is the lowest among all candidate (routing) paths. To accomplish that, in one embodiment, each node in the ad hoc network maintains a set of node information for each other node, whether the each other node is a neighbor node or not. In particular, each node in the ad hoc network maintains proximity information of every other node relative to the every other node's neighbor nodes. Proximity information may be exchanged through an enhanced routing protocol that exchanges proximity information piggybacked onto routing information. This detailed view of proximity information of every node with respect to its neighbor nodes enables a forwarding node 102 to estimate an overall path level power consumption level relating to a particular routing path. For example, the forwarding node N1 in FIG. 2 can calculate an overall path level power consumption by estimating a power consumption factor on each link of a routing path. For example, let us assume that it takes P power consumption to send a data packet to next hop over a distance of 100 meters, such as between N1 and N7. Then the power consumption to send a data packet to next hop over a distance of 50 meters, such as between N1 and N2, is ¼ of P. Power consumption can be further estimated for distances between N2 and N3, between N3 and N4, between N4 and N5, and finally N5 and N6, along the second routing path. Likewise, power consumption can be further estimated for distance between N7 and N6, along the first routing path. The total power consumption over a routing path is equal to the sum of power consumption over all the links or spans that make up the path. Thus, here, the power consumption for 100 meters is added to the power consumption between N1 and N7. Likewise, the power consumption for 50 meters is added to the power consumption over the links or spans between N2 and N3, between N3 and N4, between N4 and N5, and finally N5 and N6. Once the power consumption for all candidate (routing) paths is known, the forwarding node, in one embodiment, selects one routing path that has the lowest power consumption at the path level.

Sample Operation

Figure 3:
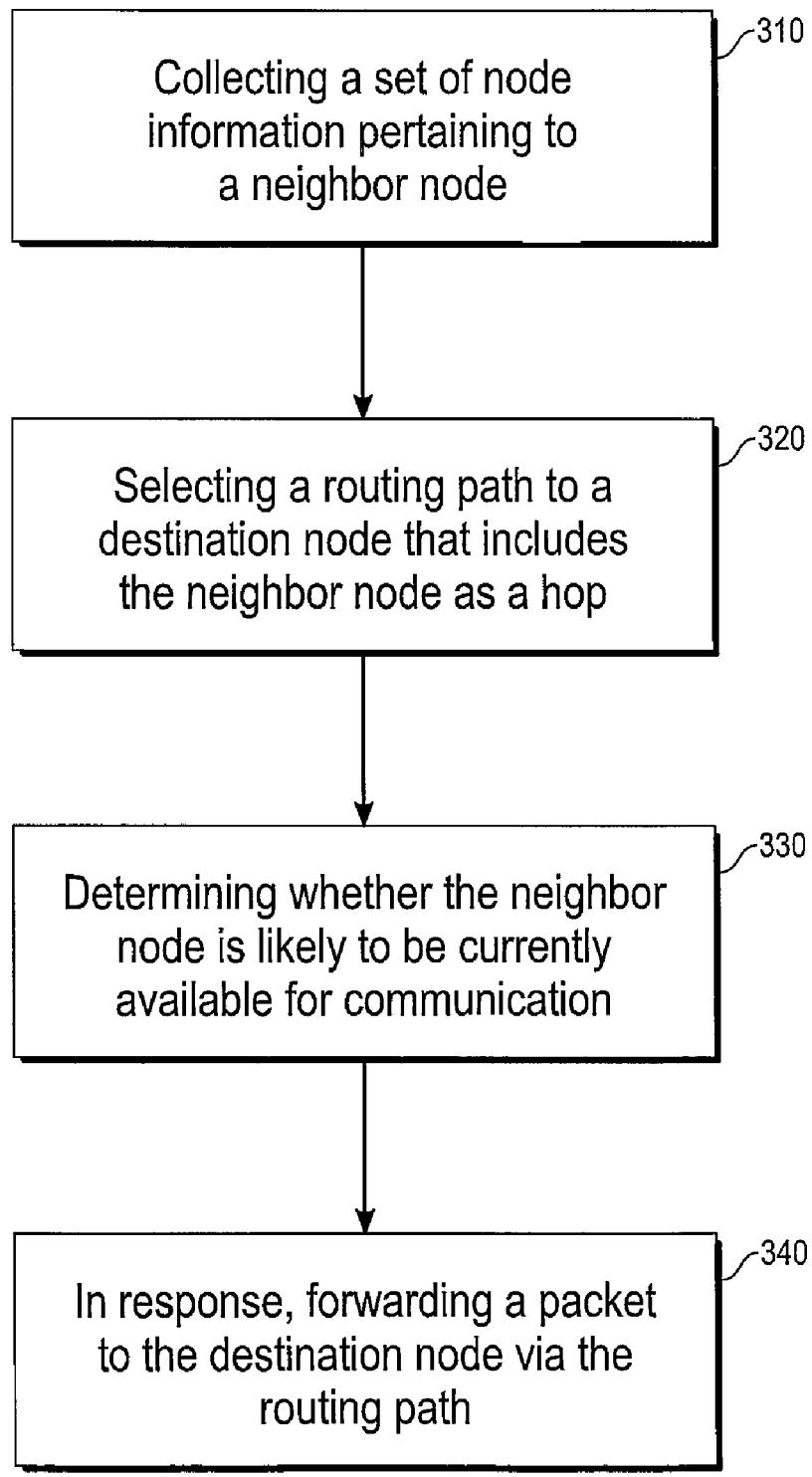
FIG. 3 is a high level flow diagram of one embodiment of the methodology of the present invention.

A flow diagram which provides a high level overview of the methodology is shown in FIG. 3. Initially, the forwarding node 102 collects sets of node information pertaining to neighbor nodes (block 310 of FIG. 3). Each set of node information contains history information about a neighbor node 106. The history information associated with a particular neighbor node 106 comprises time intervals during which that particular neighbor node 106 is available for communication.

After the sets of node information is collected, the forwarding node 102 is ready to evaluate all possible routes to the destination node 104. To do so, the forwarding node selects a routing path to the destination node 104 that includes a neighbor node as a hop (block 320 of FIG. 3).

Based on a set of node information associated with the neighbor node, the forwarding node determines whether the neighbor node is likely to be currently available for communication (block 330 of FIG. 3). In some embodiments, this determining step include taking into account other types of information such as longevity information, proximity information, transmission power level required, energy source type and/or mobility characteristic.

In response to a determination that the neighbor node is available for communication, the forwarding node forwards data packets using the routing path that includes the neighbor node as a hop (block 340 of FIG. 3). In some embodiments, not only availability probability based on history information collected is considered in this determination, but also other types of information described above in connection with block 330 of FIG. 3 are also taken into account.

Hardware Overview

Figure 4:
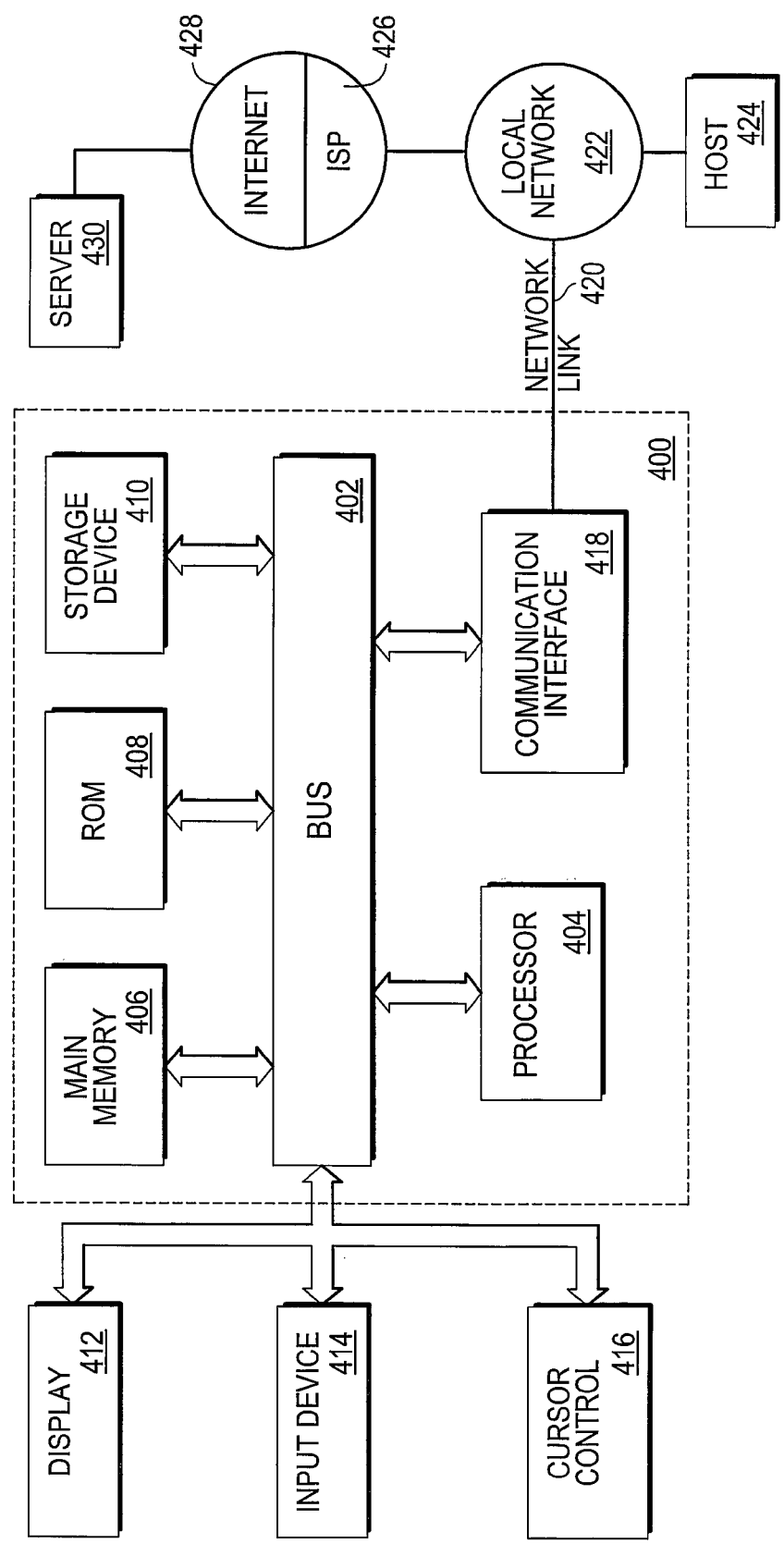
FIG. 4 is a block diagram of a general purpose computer system in which one embodiment of the present invention may be implemented.

In one embodiment, the logic and operation described herein takes the form of a set of instructions that are executed by one or more processors. FIG. 4 is a block diagram of a computer system 400 upon which an embodiment of the logic and operation described herein may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium: as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, an EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received and/or stored in storage device 410, or other non-volatile storage for later execution.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by a forwarding node in an ad hoc network, comprising:

collecting a first set of node information pertaining to a first neighbor node, wherein the first set of node information comprises:

first power information comprising a first power level required to transmit information to the first neighbor node and a first energy source weight factor corresponding to a type of energy source of the first neighbor node, and first history information indicating previous time periods during which the first neighbor node has been available for at least one prior communication, wherein the time periods are one selected from a group consisting of a time of a day and a day of a week;

calculating a first availability probability for the first neighbor node, using the first history information and a current time period;

calculating a first overall availability probability for the first neighbor node using the first availability probability and the first power information;

collecting a second set of node information pertaining to a second neighbor node, wherein the second set of node information comprises:

second power information comprising a second power level required to transmit information to the second neighbor node and a second energy source weight factor corresponding to a type of energy source of the second neighbor node, and second history information indicating previous time periods during which the second neighbor node has been available for at least one prior communication, wherein the time periods are one selected from a group consisting of a time of the day and a day of the week;

calculating a second availability probability for the second neighbor node, using the second history information and the current time period;

calculating a second overall availability probability for the second neighbor node using the second availability probability and the second power information;

selecting a first routing path to a destination node that includes the first neighbor node as a hop when the first overall availability probability is greater than the second overall availability probability; and upon selecting the first routing path, forwarding a packet to the destination node via the first routing path.

2. The method of claim 1, further comprising:
when the first overall availability probability is not greater than the second availability probability, selecting a second routing path to the destination node that includes the second neighbor node as the hop.

3. The method of claim 1, wherein the first set of node information further comprises proximity information indicating a physical distance between the first neighbor node and the forwarding node, and wherein the proximity information is taken into account in selecting the first routing path to the destination node.

4. The method of claim 1, wherein the first set of node information further comprises mobility information indicating whether the first neighbor node is one selected from a group consisting of mobile and stationary relative to the forwarding node, and wherein the mobility information is taken into account in calculating the first overall availability probability.

5. The method of claim 1, wherein the first history information in the first set of node information comprises longevity information indicating how long the first neighbor node remains available for the at least one prior communication when it is available for a potential communication, and wherein the longevity information is taken into account in calculating the first overall availability probability.

6. A non-transitory, tangible machine readable storage medium, comprising:
instructions for collecting a first set of node information pertaining to a first neighbor node, wherein the first set of node information comprises:
first power information comprising a first power level required to transmit information to the first neighbor node and a first energy source weight factor corresponding to a type of energy source of the first neighbor node, and
first history information indicating previous time periods during which the first neighbor node has been available for at least one prior communication, wherein the time periods are one selected from a group consisting of a time of a day and a day of a week;
instructions for calculating a first availability probability of the first neighbor node, using the first history information and a current time period;
instructions for calculating a first overall availability probability of the first neighbor node using the first availability probability and the first power information;

instructions for collecting a second set of node information pertaining to a second neighbor node, wherein the second set of node information comprises:
second power information comprising a second power level required to transmit information to the second neighbor node and a second energy source weight factor corresponding to a type of energy source of the second neighbor node, and
second history information indicating previous time periods during which the second neighbor node has been available for at least one prior communication, wherein the time periods are one selected from a group consisting of a time of the day and a day of the week;
instructions for calculating a second availability probability for the second neighbor node, using the second history information and a current time period;
instructions for calculating a second overall availability probability for the second neighbor node using the second availability probability and the first power information;
instructions for selecting a first routing path to a destination node that includes the neighbor node as a hop when the first overall availability probability is greater than the second overall availability probability; and
instructions for forwarding a packet to the destination node via the first routing path upon selecting the first routing path.

7. The machine readable storage medium of claim 6, further comprising:
instructions for selecting a second routing path to the destination node that includes the second neighbor node as the hop when the first overall availability probability is not greater than the second availability probability.

8. The machine readable storage medium of claim 6, wherein the first set of node information further comprises proximity information indicating a physical distance between the first neighbor node and a forwarding node, and wherein the proximity information is taken into account in selecting the first routing path to the destination node.

9. The machine readable storage medium of claim 6, wherein the first set of node information further comprises mobility information indicating whether the first neighbor node is one selected from a group consisting of mobile and stationary relative to a forwarding node, and wherein the mobility information is taken into account in calculating the first overall availability probability.

10. The machine readable storage medium of claim 6, wherein the first history information in the first set of node information comprises longevity information indicating how long the first neighbor node remains available for the at least one prior communication when it is available for a potential communication, and wherein the longevity information is taken into account in calculating the first overall availability probability.

11. A forwarding node in an ad hoc network, wherein the forwarding node is configured to:
collect, by a processor, a first set of node information pertaining to a first neighbor node, wherein the first set of node information comprises:
first power information comprising a first power level required to transmit information to the first neighbor node and a first energy source weight factor corresponding to a type of energy source of the first neighbor node, and
first history information indicating previous time periods during which the first neighbor node has been available for at least one prior communication, wherein the time periods are one selected from a group consisting of a time of a day and a day of a week;

calculate, by the processor, a first availability probability for the first neighbor node, using the first history information and a current time period;

calculate, by the processor, a first overall availability probability for the first neighbor node using the first availability probability and the first power information;

collect, by the processor, a second set of node information pertaining to a second neighbor node, wherein the second set of node information comprises:

second power information comprising a second power level required to transmit information to the second neighbor node and a second energy source weight factor corresponding to a type of energy source of the second neighbor node, and second history information indicating previous time periods during which the second neighbor node has been available for at least one prior communication, wherein the time periods are one selected from a group consisting of a time of the day and a day of the week;

calculate, by the processor, a second availability probability for the second neighbor node, using the second history information and the current time period;

calculate, by the processor, a second overall availability probability for the second neighbor node using the second availability probability and the second power information;

select, by the processor, a first routing path to a destination node that includes the first neighbor node as a hop when the first overall availability probability is greater than the second overall availability probability; and forward, by the processor, a packet to the destination node via the first routing path upon selecting the first routing path.

12. The forwarding node of claim 11, further configured to:
when the first overall availability probability is not greater than the second availability probability, select, by the processor, a second routing path to the destination node that includes the second neighbor node as the hop.

13. The forwarding node of claim 11, wherein the first set of node information further comprises mobility information indicating whether the first neighbor node is one selected from a group consisting of mobile and stationary relative to the forwarding node, and wherein the mobility information is taken into account in calculating the first overall availability probability.

14. The forwarding node of claim 11, wherein the first history information in the first set of node information comprises longevity information indicating how long the first neighbor node remains available for the at least one prior communication when it is available for potential communication, and wherein the longevity information is taken into account in calculating the first overall availability probability.

* * * * *